July 19, 1960     E. M. DAVIS, JR     2,946,022

ELECTRICAL INVERTER CIRCUIT

Filed Nov. 20, 1956

WITNESSES:

Bernard R. Gieguey

Wm. B. Sellers.

INVENTOR

Edward M. Davis, Jr.

BY David M. Schiller

ATTORNEY

United States Patent Office 2,946,022
Patented July 19, 1960

1

2,946,022

ELECTRICAL INVERTER CIRCUIT

Edward M. Davis, Jr., Pittsburgh, Pa., assignor to Westinghouse Electric Corporation, East Pittsburgh, Pa., a corporation of Pennsylvania Filed Nov. 20, 1956, Ser. No. 623,357

7 Claims. (Cl. 331—113)

This invention relates to electrical inverter circuits and has particular relation to inverter circuits of the self-excited type.

According to the present invention an electrical inverter circuit of improved construction is provided for producing an alternating output quantity from a direct input quantity. Although the invention has many and varied applications it will be described in connection with an inverter circuit of the self-excited type.

In the present invention an inverter circuit or oscillator is provided which includes saturable magnetic core means connected for magnetization from a direct input quantity through a pair of current paths which provide opposing directions of magnetization of the core means. A separate switch device is included in each of the paths having operating conditions which are transferable in phase opposition relative to each other in response to saturation of the core means. The core means includes output winding means for supplying to a suitable load device an alternataing output quantity having a rectangular wave pattern with a frequency proportional to the frequency of saturation of the core means.

In the circuit described the frequency of saturation of the core means is dependent upon the frequency of transfer of the operating conditions of the switch means which is further dependent upon the magnitude of the direct input quantity. Consequently, the frequency of the output quantity is proportional to the magnitude of the input quantity. It is observed then that the frequency of the output quantity is limited by operation of the switch means. It has also been noted that the wave form of the output quantity may be affected by operation of the switch means. In the present invention an inverter circuit is provided which includes control means for controlling operation of the switch means in a manner permitting extremely effective transfer of the switch operating conditions to produce an output quantity having very desirable wave form and frequency characteristics. The invention is particularly effective in providing an output quantity having frequencies higher than heretofore obtainable in such circuits.

In a preferred embodiment of the invention, the inverter circuit includes a saturable magnetic core having a pair of input windings each connected in a separate current path for energization from the direct input quantity. A separate switch device in the form of a three-electrode transistor is connected with the emitter and collector electrodes in each of the paths to control energization of the input windings. In order to control operation of the transistors a pair of control windings are provided which link the core in inductive relation with the input windings. Each of the control windings is connected to apply bias voltages induced therein between the base electrode and one of the emitter and collector electrodes of a separate one of the transistors to establish opposing current conducting conditions of the transistors between the emitter and collector electrodes.

According to the invention, the inverter circuit includes control means in the form of a pair of resistor-condenser networks each connected in a separate one of the transistor base circuits for further controlling operation of the transistors. These networks are arranged to supply additional bias voltages for effecting very rapid transfers of the transistors between current conducting and non-conducting conditions. The invention further provides an inverter circuit wherein substantially equal currents are supplied to the transistor base electrodes having magnitudes sufficient to assure proper operation of the inverter circuit.

It is, therefore, an object of the invention to provide an improved electrical inverter circuit.

It is another object of the invention to provide an improved self-excited electrical inverter circuit for producing an alternating output quantity from a direct current input quantity.

It is a further object of the invention to provide an electrical inverter circuit as defined in the preceding paragraph including control means permitting the production of an output quantity having improved wave form and frequency characteristics.

It is still another object of the invention to provide an inverter circuit as defined in said preceding paragraph including a pair of switch devices with control means arranged to effect an extremely rapid transfer of the switch operating conditions.

Other objects of the invention will become apparent from the following description taken in conjunction with the accompanying drawings, in which.

Figure 1:
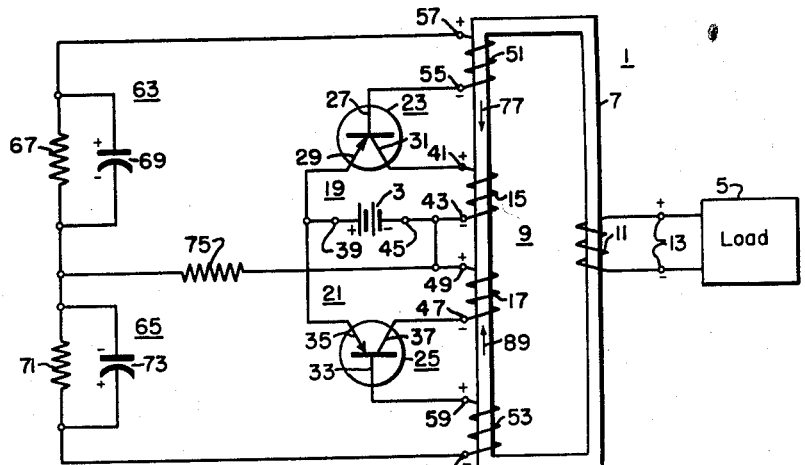
Figure 1 is a circuit diagram illustrating an electrical inverter circuit embodying the teachings of the invention.

Referring to the drawings, there is illustrated in Fig. 1 an electrical inverter circuit represented generally by the numeral 1 embodying the teachings of the present invention. The inverter 1 includes a source of unidirectional voltage which is represented by the battery 3 for providing a unidirectional input quantity which is to be inverted. The source 3 may comprise any suitable source of unidirectional voltage having either a constant or variable magnitude. A suitable load device schematically represented by the block 5 is shown associated with the inverter 1 for energization in accordance with the alternating output quantity of the inverter 1.

The inverter 1 includes translating means shown in the form of a magnetic core 7 which may be constructed of any suitable magnetic material. The core 7 is preferably formed of a material which exhibits substantially rectangular hysteresis loop characteristics. A number of such materials are commercially available at the present time. For example, the core 7 may be constructed of an alloy comprising approximately equal parts of nickel and iron. The core 7 is further designed for magnetic saturation within the range of energization thereof.

In order to permit magnetization of the core 7, suitable input winding means 9 are provided to link the core 7. An output winding 11 also links the core 7 in inductive relation with the winding means 9 for supplying an alternating output quantity to the load device 5. The winding 11 includes a pair of output terminals 13 connected to the load device 5 to permit energization of the device 5 in accordance with voltage induced in the winding 11 in response to energization of the winding means 9.

In order to permit magnetization of the core 7 in accordance with current of the source 3 for causing the induction of an alternating output voltage in the winding 11, the winding means 9 is shown in the form of a pair of windings 15 and 17 each connected for energization from the source 3 through a separate current path to provide opposing directions of magnetization of the core 7. As shown in Fig. 1, the winding 15 is included in the current path 19 whereas the winding 17 is included in the current path 21.

For the purpose of controlling energization of the windings 15 and 17 from the source 3, a pair of switch devices 23 and 25 are included respectively in the paths 19 and 21. The devices 23 and 25 may take any suitable form. For example, the devices 23 and 25 may comprise electroresponsive valve devices such as three-electrode vacuum tubes. Preferably, however, the switch devices 23 and 25 are in the form of three-electrode junction transistor devices. In Fig. 1, the transistors are illustrated in the form of p-n-p transistors with the transistor 23 having a base electrode 27, an emitter electrode 29 and a collector electrode 31, and with the transistor 25 having a base electrode 33, an emitter electrode 35 and a collector electrode 37.

In the present invention, the transistors are biased to operate as controlled switch devices so that each transistor has a closed operating condition wherein the transistor exhibits a very low impedance condition between the emitter and collector electrodes, and an open operating condition wherein the transistor exhibits a very high impedance condition between the emitter and collector electrodes. In order to provide efficient operation of the inverter circuit, the transistors 23 and 25 are preferably operated to transfer between "saturated" and "cutoff" conditions.

As employed herein, the term "saturated" denotes a condition of a transistor wherein a further increase in the magnitude of forward current between the base and emitter electrodes has a negligible effect upon the magnitude of current between the emitter and collector electrodes. This saturated condition corresponds to the closed operating conditions of the transistors. The term "cutoff" as employed herein refers to a condition of a transistor wherein a further increase in the magnitude of reverse voltage between the base and emitter electrodes is ineffective to further decrease the magnitude of current between the emitter and collector electrodes. This cutoff condition corresponds to the open operating condition of the transistors.

As illustrated in Fig. 1, the emitter electrode 29 of the transistor 23 is connected in the path 19 to the positive terminal 39 of the source 3 whereas the collector electrode 31 is connected in the path 19 to one terminal 41 of the winding 15. The other terminal 43 of the winding 15 is connected to the negative terminal 45 of the source 3. In a similar manner the emitter electrode 35 of the transistor 25 is connected in the path 21 to the terminal 39 and the collector electrode 37 is connected in the path 21 to one terminal 47 of the winding 17. The other terminal 49 of the winding 17 is connected to the terminal 45.

In order to control operation of the transistors 23 and 25, control means in the form of a pair of windings 51 and 53 is provided to link the core 7 in inductive relation with the windings 15 and 17. The windings 51 and 53 are connected respectively to apply voltages induced therein to the transistors 23 and 25 so as to establish opposing conducting conditions of the transistors. For this purpose one terminal 55 of the winding 51 is connected to the base electrode 27 of the transistor 23 whereas the other terminal 57 of the winding 51 is connected to the emitter electrode 29 through circuit components described hereinafter. In a similar manner the terminal 59 of the winding 17 is connected to the base electrode 33 of the transistor 25 whereas the terminal 61 of the winding 17 is connected to the emitter electrode 35 through additional circuit components described hereinafter. As thus far described the circuit 1 is identical in all respects to the inverter circuit described in application Serial No. 421,350, filed April 6, 1954, by Richard L. Bright and George H Royer now Patent No. 2,783,384, issued on February 26, 1957, to the assignee of the present invention.

For the purpose of further controlling operation of the transistors 23 and 25, the invention provides that the circuit 1 include additional control means connected in the base circuits of the transistors. In a preferred embodiment of the invention, the additional control means is in the form of a pair of resistor-condenser networks represented generally by the numerals 63 and 65.

As illustrated in Fig. 1, the network 63 includes a resistor 67 which is connected between the base electrode 27 and the emitter electrode 29 of the transistor 23. The network 63 further includes a condenser 69 connected in parallel circuit relation with the resistor 67. In a similar manner the network 65 includes a resistor 71 connected between the base electrode 33 and the emitter electrode 35 of the transistor 25 with a condenser 73 connected in parallel circuit relation with the resistor 71. The circuit 1 further includes a resistor 75 which is connected between the base and emitter electrodes of each of the transistors 23 and 25 in series circuit relation with the source 3. As will appear hereinafter, the resistor 75 assists in providing desirable operation of the circuit 1. The operation of the circuit 1 will now be described according to the present understanding of the invention.

When the source 3 is connected in the circuit 1, it has been observed that one of the transistors 23 and 25 will eventually assume a current conducting condition and that the other of the transistors will assume a non-current conducting condition. For purposes of discussion, it will be assumed that the transistor 23 is initially in a conducting condition to provide a current conductive condition of the path 19, and that the transistor 25 is in a non-conducting condition to provide a current blocking condition of the path 21.

For this condition then a substantial portion of current from the source 3 will flow through the emitter electrode 29, the collector electrode 31 and the winding 15 back to the source 3. Such current flow through the winding 15 establishes a magnetomotive force which directs magnetic flux through the core 7 in the direction indicated by the arrow 77. If the magnitude of voltage of the source 3 is assumed to be constant, then the resulting change in magnetic flux of the core 7 is at a constant rate thereby causing voltages to be induced in the windings 11, 15, 17, 51 and 53 of constant magnitudes. The polarities of these induced voltages are indicated by the plus and minus signs associated with the several windings. The voltages so induced in the windings 51 and 53 have polarities and magnitudes effective to establish respectively a saturated condition of the transistor 23, and a cutoff condition of the transistor 25.

It is observed that during energization of the winding 15 from the source 3 a lesser portion of current from the source 3 also flows through the emitter electrode 29 of the transistor 23, the base electrode 27, the winding 51, the resistor 67 and the resistor 75 back to the source 3. This current in addition to current produced by voltage induced in the winding 51 establishes a voltage across the resistor 67 which charges the condenser 69 with polarity indicated by the associated plus and minus signs. It is noticed that the resultant voltage of the condenser 69 opposes the voltage induced in the winding 51. The magnitudes of the resistor 67 and condenser 69 are selected such that the time constant of the network 63 is equal to approximately the period of the alternating output quantity. With this arrangement the voltage of the condenser 69 remains substantially constant during operation of the circuit 1 and is somewhat less than voltage induced in the winding 51 during conduction of the transistor 23 whereby such conduction is effectively maintained.

Figures 3, 4:
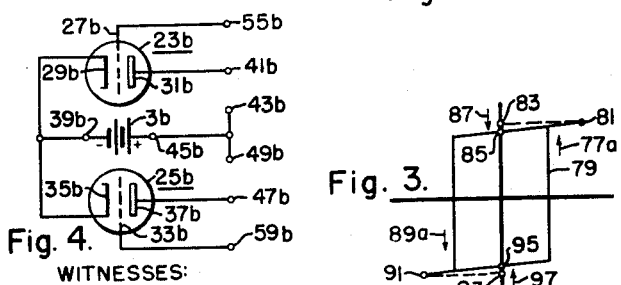
Fig. 3 is a graphical representation illustrating the hysteresis characteristics of a magnetic core employed in the circuits of Figs. 1 and 2.
Fig. 4 is a partial circuit diagram illustrating another embodiment of the invention.

In Fig. 3 there is illustrated a curve 79 which represents the hysteresis characteristics exhibited by the core 7. The curve 79 is plotted relative to ordinates which represent magnetic induction of the core 7 and abscissae which represent the magnetomotive force applied to the core 7. The arrow 77a in Fig. 3 indicates the direction of flux relative to the core 79 corresponding to the core flux direction indicated by the arrow 77a of Fig. 1. The point of saturation of the core 7 caused by flux flowing in the direction of the arrow 77 of Fig. 1 is indicated by a point 81 on the curve 79 of Fig. 3. The magnitude of flux of the core 7 at the point of saturation 81 is indicated by a point 83 on the ordinate of Fig. 3.

Upon the occurrence of saturation of the core 7 caused by continued current flow through the winding 15 the voltages induced in the windings 11, 15, 17, 51 and 53 are induced from the constant value thereof established during magnetization of the core 7 in the direction of the arrow 77a to a zero value. At the same time voltage of the condenser 69 has increased slightly to a value sufficient to initiate a transfer of the transistor 23 from a saturated condition to a cutoff condition. When this occurs, current flowing through the winding 15 and the magnetomotive force established thereby is reduced to a zero value. At this time the voltage of the condenser 69 begins to decrease. This decrease is at a very slow rate, however, due to the large time constant of the network 63.

Reduction of the magnetomotive force to a zero value as explained above results in a decrease of the flux in the core 7 from the value thereof indicated by the point 83 to a value which is indicated by a point 85 of the curve 79. The point 85 represents the flux retentivity point of the core 7 for core saturation in the direction of the arrow 77a. This flux change is in a direction indicated by the arrow 87 of Fig. 3 which is opposite to the direction of flux change produced during magnetization of the core in the direction of the arrow 77a. The change in the flux from the point 83 to the point 85 causes voltages to be induced in the windings 51 and 53 having polarities opposite to the polarities of the voltages induced in such windings during magnetization of the core in the direction of the arrow 77a. The voltage so induced in the winding 51 aids the voltage of the condenser 69 with the result that an extremely rapid transfer of the transistor 23 from a saturated condition to a cutoff condition is effected to provide a current blocking condition of the path 19. At the same time the voltage so induced in the winding 53 initiates a transfer of the transistor 25 from a cutoff condition to a saturated condition.

When the transistor 25 is transferred to a saturated condition the path 25 assumes a current conductive condition with a substantial portion of current from the source 3 flowing through the emitter electrode 35 of the transistor 25, the collector electrode 37, and the winding 17 back to the source 3 to establish a magnetomotive force which directs flux through the core 7 in the direction indicated by the arrow 89 of Fig. 1 which is opposite to the direction of the arrow 77. As the flux of the core is increased, constant voltages are induced in the windings 11, 15, 17, 51 and 53 having polarities which are opposite to the polarities indicated in Fig. 1. The resulting voltage induced in the winding 51 aids the voltage of the condenser 69 to maintain a cutoff condition of the transistor 23 whereas the voltage so induced in the winding 53 maintains the saturated condition of the transistor 25.

At the same time a lesser portion of current from the source 3 flows through the emitter electrode 35, the base electrode 33, the resistor 71 and the resistor 75 back to the source 3. This current in addition to current produced by voltage induced in the winding 53 establishes a voltage across the resistor 71 which charges the condenser 73 with polarity indicated by the associated plus and minus signs. The resultant voltage of the condenser 73 opposes the voltage induced in the winding 53 during energization of the winding 17. The network 65 is selected to exhibit substantially identical characteristics as the network 63 with a time constant equal to approximately the period of the alternating output quantity. With such arrangement the voltage of the condenser 73 remains substantially constant and is somewhat less than voltage induced in the winding 53 during conduction of the transistor 25 whereby such condition is maintained.

In Fig. 3, the direction of flux relative to the curve 79 which corresponds to the direction indicated by the arrow 89 of Fig. 1 is indicated by the arrow 89a. The point of saturation of the core 7 caused by flux flowing in the direction of the arrow 89a is represented by the numeral 91, and the magnitude of flux of the core at the saturation point 91 is indicated by the point 93 on the ordinate of Fig. 3.

When the core 7 saturates as a result of continued current flow through the winding 17, voltages induced in the windings 11, 15, 17, 51 and 53 fall to a zero value. At the same time voltage of the condenser 73 has increased slightly to a value sufficient to initiate a transfer of the transistor 25 from a saturated condition to a cutoff condition. When this occurs, current flowing through the winding 17 and the magnetomotive force established thereby is reduced to a zero value.

This reduction of the magnetomotive force results in a decrease of the flux in the core 7 from the value thereof indicated by the point 93 to a value which is indicated by a point 95 of the curve 79. The point 95 represents the flux retentivity point of the core 7 for core saturation in the direction of the arrow 89a. This flux change is in a direction indicated by the arrow 97 of Fig. 3 which is opposite to the direction of flux change produced during magnetization of the core in the direction of the arrow 89a. The change in flux from the point 93 to the point 95 causes voltages to be induced in the windings 51 and 53 having polarities as indicated by the associated plus and minus signs of Fig. 1. The voltage so induced in the winding 53 aids the voltage of the condenser 73 with the result that an extremely rapid transfer of the transistor 25 from a saturated condition to a cutoff condition is effected. Simultaneously, the voltage so induced in the winding 51 is effective to initiate a transfer of the transistor 23 from a cutoff condition to a saturated condition since voltage of the condenser 69 has now been reduced slightly to a value less than the value of such induced voltage. The cycle of operation of the inverter circuit 1 above described is then repeated.

It is noticed that the condensers 69 and 73 provide a low impedance in the base circuits for the transistors 23 and 25. This is highly desirable in that it permits a quick reverse of the base currents which effects a rapid transfer of the transistors from saturated to cutoff conditions. The networks 63 and 65 are effective to increase the rate of establishment of the current blocking conditions for the paths 19 and 21, and to decrease the rate of establishment of the current conductive conditions of the paths. This results in the minimizing of overlap of the conductive conditions of the paths.

It is observed that during a saturated condition of the transistor 23 a constant voltage is induced in the winding 11 having a polarity as indicated by the associated plus and minus signs. When the transistor 25 is in a saturated condition, the constant voltage induced in the winding 11 has polarity which is opposite to the polarity indicated in Fig. 1. Consequently, an alternating voltage having a rectangular wave pattern is induced in the winding 11 which has a frequency dependent upon the frequency of transfer of the transistors between saturated and cutoff conditions. Since such a transfer is effected upon each occurrence of saturation of the core 7, the frequency of the voltage induced in the winding 11 is determined by the time required for flux of the core to change between the values indicated by the points 83 and 93 of Fig. 3. It may be shown that the time required for such a flux change in dependent upon the magnitude of voltage of the source 3. Consequently, the frequency of voltage induced in the winding 11 is directly proportional to the magnitude of voltage of the source 3. This characteristic of the output voltage renders the inverter circuit extremely useful in the field of telemetering where it is desired that the output frequency transmitted between a measuring point and a metering station represent an indication of the magnitude of a measured voltage quantity.

In order to provide efficient operation of the circuit 1 it is necessary that the base currents for the transistors 23 and 25 have a certain minimum value effective to cause saturated and cutoff conditions of the transistors. However, it has been observed that the base resistances of a number of transistors may vary over a considerable range. For example, it is found that if base bias voltages of equal magnitudes are applied to a number of transistors the resulting base currents may differ in value by a factor as high as three or four. Such a condition may adversely affect the operation of the inverter circuit 1.

In order to correct this condition, the invention provides the resistor 75 connected in the transistor base circuits as shown in Fig. 1. The resistance of the resistor 75 is selected to be sufficiently large so that the magnitudes of the base currents for the transistors 23 and 25 are substantially constant and equal over a wide range of values of voltage of the source 3. It is also desirable for high frequency operation of the circuit 1 that the transistors 23 and 25 be rapidly transferred from a cutoff condition to a saturated condition. To this end the resistor 75 is connected in the transistor base circuits in series circuit relation with the source 3. With this arrangement the source 3 assists in providing base currents for the transistors sufficient to assure proper operation of the circuit 1 under high frequency conditions. The inverter circuit of Fig. 1 has been observed to provide an output voltage of rectangular wave form having a frequency which may be, for example, on the order of forty kilocycles per second with an average power output of approximately ten watts.

Figure 2:
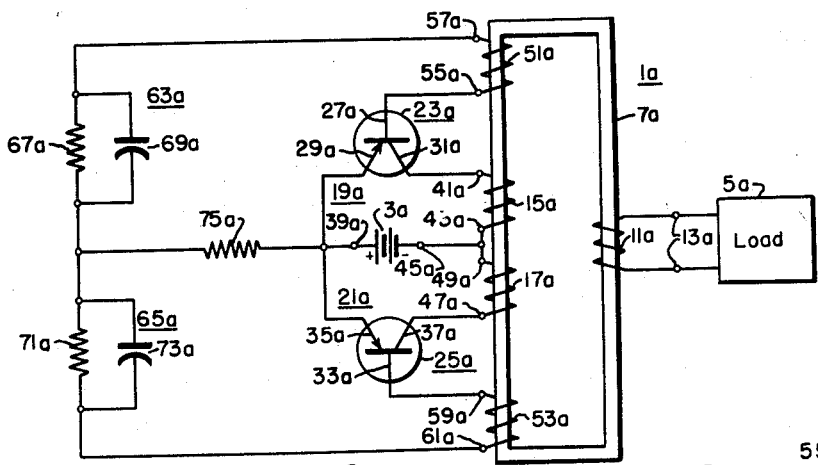
Fig. 2 is a circuit diagram similar to Fig. 1 illustrating a different embodiment of the invention.

For low frequency operation of the circuit 1, such as frequencies less than approximately six kilocycles per second, the resistor 75 may be connected in the manner shown in Fig. 2. In Fig. 2 components which are similar to the components of Fig. 1 are represented by the same reference numerals with the suffix a.

As shown in Fig. 2, a resistor 75a corresponding to the resistor 75 of Fig. 1 is connected directly to the emitter eletrodes 29a and 35a of the transistors 23a and 25a. With such arrangement base currents for the transistors are supplied mainly by voltages induced in the windings 51a and 53a. It has been observed that the base currents so produced are sufficient to provide proper operation of the circuit 1 for such low frequency operation. Operation of the circuit 1a of Fig. 2 is similar to that of the circuit 1 of Fig. 1 and for this reason will not be described.

Fig. 4 illustrates a different embodiment of the invention than those shown in Figs. 1 and 2. In Fig. 4 there is shown a pair of switch devices 23b and 25b which are in the form of three-electrode vacuum tubes. As there shown the tube 23b has a grid 27b, cathode 29b and plate 31b which correspond respectively to the base 27, emitter 29 and collector 31 of the transistor 23. In a similar manner the tube 25b includes a grid 33b, cathode 35b and plate 37b corresponding respectively to the base 33, emitter 35 and collector 37 of the transistor 25.

Figure 5:
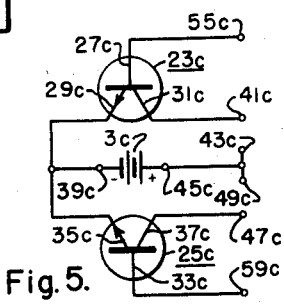
Fig. 5 is a circuit diagram similar to Fig. 4 illustrating still another embodiment of the invention.

In Fig. 5 a pair of transistors 23c and 25c of the n-p-n type are employed in place of the p-n-p transistors shown in Figs. 1 and 2. With the arrangement of Fig. 5 it is necessary to reverse the connections of the battery 3c to the emitter and collector electrodes of the transistors 23c and 25c from the connections shown in Figs. 1 and 2.

Although the invention has been described with reference to certain specific embodiments thereof, numerous modifications are possible, and it is desired to cover all modifications falling within the spirit and scope of the invention.

I claim as my invention:

1. In an oscillator, first and second current paths, switching means cooperating with said current paths for establishing periodically a current conductive condition of the first path and a current blocking condition of the second path followed by a current blocking condition of the first path and a current conductive condition of the second path, and means for minimizing overlap of current conductive conditions of the two paths, said means comprising auxiliary means effective when a blocking condition is to be established for increasing the rate of establishment of the blocking condition, said means being substantially ineffective to decrease the rate of establishment of the conducting condition.

2. In an oscillator, first and second current paths, switching means cooperating with said current paths for establishing periodically a current conductive condition of the first path and a current blocking condition of the second path followed by a current blocking condition of the first path and a current conductive condition of the second path, and means for minimizing overlap of current conductive conditions of the two paths, said means comprising auxiliary means effective when a blocking condition is to be established for increasing the rate of establishment of the blocking condition, and for increasing the rate of establishment of a conductive condition.

3. In an electrical system, a source of unidirectional input voltage, a pair of terminals energizable from said source, a pair of electrical paths connecting the terminals for energization from said source to provide opposing directions of energization of said terminals, a pair of electroresponsive valve devices each having at least three electrodes, a pair of electrodes of each of said devices being included in a separate one of said paths, first control means for producing first biasing potentials of reversing polarity for biasing said devices, said first control means being connected to apply a separate first biasing potential between one electrode of each pair of electrodes and a third electrode of each device, each of said devices having a substantially nonconducting condition between said pair of electrodes for one polarity of said first biasing potentials, and a conducting condition between said pair of electrodes for the opposite polarity of said first biasing potentials, said first control means being connected to apply said first biasing potentials with polarities effective to establish opposing conducting conditions of said devices, each of said devices being biased so as to transfer from one to the other of said conducting conditions in response to each reversal of polarity of the applied first biasing potential, said paths delivering to said terminals an alternating quantity having a frequency dependent upon the frequency of reversal of polarity of said first biasing potentials, and second control means connected to apply a separate second biasing potential of constant polarity and variable magnitude between said one electrode and said third electrode of each device, said first and second control means being arranged to apply aiding biasing potentials to the nonconducting one of said devices, and to apply opposing biasing potentials to the conducting one of said devices.

4. In an electrical system, a source of unidirectional input voltage, a pair of terminals energizable from said source, a pair of electrical paths connecting the terminals for energization from said source to provide opposing directions of energization of said terminals, a pair of transistor devices each having base, emitter and collector electrodes, the emitter and collector electrodes of each of said devices being included in a separate one of said paths, first control means for producing first biasing potentials of reversing polarity for biasing said devices, said first control means being connected to apply a separate first biasing potential between the base electrode and one of the emitter and collector electrodes of each of said devices, each of said devices having a substantially nonconducting condition between the emitter and collector electrodes for one polarity of said first biasing potentials, and a conducting condition between the emitter and collector electrodes for the opposite polarity of said first biasing potentials, said first control means being connected to apply said first biasing potentials with polarities effective to establish opposing conducting conditions of said devices, each of said devices being biased so as to transfer from one to the other of said conducting conditions in response to each reversal of polarity of the applied first biasing potential, said paths delivering to said terminals an alternating quantity having a frequency dependent upon the frequency of reversal of polarity of said first biasing potentials, and second control means connected to apply a separate second biasing potential of constant polarity and variable magnitude between said one electrode and said base electrode of each device, said first and second control means being arranged to apply aiding biasing potentials to the nonconducting one of said devices, and to apply opposing biasing potentials to the conducting one of said devices.

5. In an electrical system, a source of unidirectional input voltage, a pair of terminals energizable from said source, a pair of electrical paths connecting the terminals for energization from said source to provide opposing directions of energization of said terminals, a pair of transistor devices each having base, emitter and collector electrodes, the emitter and collector electrodes of each of said devices being included in a separate one of said paths, first control means for producing first biasing potentials of reversing polarity for biasing said devices, said first control means being connected to apply a separate first biasing potential between the base electrode and one of the emitter and collector electrodes of each of said devices, each of said devices having a substantially nonconducting condition between the emitter and collector electrodes for one polarity of said first biasing potentials, and a conducting condition between the emitter and collector electrodes for the opposite polarity of said first biasing potentials, said first control means being connected to apply said first biasing potentials with polarities effective to establish opposing conducting conditions of said devices, each of said devices being biased so as to transfer from one to the other of said conducting conditions in response to each reversal of polarity of the applied first biasing potential, said paths delivering to said terminals an alternating quantity having a frequency dependent upon the frequency of reversal of polarity of said first biasing potentials, and second control means connected to apply a separate second biasing potential of constant polarity and variable magnitude between said one electrode and said base electrode of each device, said second control means comprising a pair of electrical networks each connected between said one electrode and said base electrode of a separate one of said transistor devices, each of said networks including a resistor and a condenser connected in parallel relation.

6. In an electrical system, a source of unidirectional input voltage, a pair of terminals energizable from said source, a pair of electrical paths connecting the terminals for energization from said source to provide opposing directions of energization of said terminals, a pair of transistor devices each having base, emitter and collector electrodes, the emitter and collector electrodes of each of said devices being included in a separate one of said paths, first control means for producing first biasing potentials of reversing polarity for biasing said devices, said first control means being connected to apply a separate first biasing potential between the base and one of the emitter and collector electrodes of each of said devices, each of said devices having a substantially nonconducting condition between the emitter and collector electrodes for one polarity of said first biasing potentials, and a conducting condition between the emitter and collector electrodes for the opposite polarity of said first biasing potentials, said first control means being connected to apply said first biasing potentials with polarities effective to establish opposing conducting conditions of said devices, each of said devices being biased so as to transfer from one to the other of said conducting conditions in response to each reversal of polarity of the applied first biasing potential, said paths delivering to said terminals an alternating quantity having a frequency dependent upon the frequency of reversal of polarity of said first biasing potentials, and second control means connected to apply a separate second biasing potential of constant polarity and variable magnitude between said one electrode and said base electrode of each device, said second control means comprising a pair of electrical networks each connected between said one electrode and said base electrode of a separate one of said transistor devices, each of said networks including a resistor and a condenser connected in parallel relation, each of said networks having a time constant which is substantially equal to the period of the alternating quantity.

7. In an electrical inverter system, a pair of output terminals, a source of unidirectional voltage, and inverter means for delivering to the output terminals an alternating output voltage having a frequency dependent upon the magnitude of said source, said inverter means including saturable magnetic core means, a pair of electrical paths connected for energization from said source for supplying to said core means magnetomotive forces acting in opposing directions, a pair of semiconductor devices each having a base electrode, an emitter electrode and a collector electrode, the emitter and collector electrodes of each of said devices being included in a separate one of said paths, each of said devices being operable to transfer the associated path between a conductive condition and a substantially nonconductive condition, first control means effective in response to saturation of said core means produced by a conductive condition of one of said paths while the other of said paths is in a substantially nonconductive condition to apply biasing potentials between the base electrode and one of the emitter and collector electrodes of each of said devices to operate said devices for reversing the conductive conditions of said paths, said first control means being additionally effective in response to saturation of said core means produced by a conductive condition of said other of said paths while said one of said paths is in a substantially nonconductive condition to apply biasing potentials between the base electrode and one of the emitter and collector electrodes of each of said devices to operate said devices for reversing the conductive conditions of said paths, second control means connected to apply a separate second biasing potential of constant polarity between the base electrode and said one of the emitter and collector electrodes of each of said devices, said first and second control means being arranged to apply aiding biasing potentials to the device included in the nonconducting one of said paths, and to apply opposing biasing potentials to the device included in the conducting one of said paths, said second control means comprising a pair of electrical networks each connected between the base and said one of the emitter and collector electrodes of a separate one of said devices, each of said networks including a resistor and a condenser connected in parallel relation, and output winding means linking said core means to deliver to said output terminals alternating voltage induced therein having a frequency dependent upon the frequency of saturation of said core means, each of said networks having a time constant which is not substantially greater than the period of the alternating output voltage.

References Cited in the file of this patent

UNITED STATES PATENTS

| | | |
|---|---|---|
| 2,748,274 | Pearlman | May 29, 1956 |
| 2,757,243 | Thomas | July 31, 1956 |
| 2,760,088 | Pittman et al. | Aug. 21, 1956 |
| 2,774,878 | Jensen | Dec. 18, 1956 |
| 2,783,384 | Bright et al. | Feb. 26, 1957 |
| 2,787,712 | Priebe et al. | Apr. 2, 1957 |
| 2,831,113 | Weller | Apr. 15, 1958 |
| 2,843,815 | Driver | July 15, 1958 |

OTHER REFERENCES

Article: "Operation of a Saturable Core Square Wave Oscillator"; by Donald C. Mogen in a paper presented to the 1956 National Conference on Aeronautical Electronics at Dayton, Ohio, May 16, 1956, published by Transistor Div., Minneapolis Honeywell Co., Minneapolis 8, Minnesota.